United States Patent
Borissovskiy

(10) Patent No.: US 10,041,439 B2
(45) Date of Patent: *Aug. 7, 2018

(54) COMBUSTION CHAMBER, METHOD FOR IGNITING A FUEL-AIR MIXTURE IN A COMBUSTION CHAMBER OF AN INTERNAL COMBUSTION ENGINE AND INTERNAL COMBUSTION ENGINE

(71) Applicant: Vladimir Borissovskiy, Leipzig (DE)

(72) Inventor: Vladimir Borissovskiy, Leipzig (DE)

( * ) Notice: Subject to any disclaimer, the term of this patent is extended or adjusted under 35 U.S.C. 154(b) by 133 days.

This patent is subject to a terminal disclaimer.

(21) Appl. No.: 14/351,569

(22) PCT Filed: Oct. 15, 2012

(86) PCT No.: PCT/IB2012/002232
§ 371 (c)(1),
(2) Date: Sep. 1, 2014

(87) PCT Pub. No.: WO2013/054187
PCT Pub. Date: Apr. 18, 2013

(65) Prior Publication Data
US 2015/0027408 A1    Jan. 29, 2015

(30) Foreign Application Priority Data
Oct. 14, 2011    (DE) .................. 10 2011 116 371

(51) Int. Cl.
*F02F 1/24*    (2006.01)
*F02B 23/06*    (2006.01)
(Continued)

(52) U.S. Cl.
CPC .......... *F02F 1/242* (2013.01); *F02B 23/0633* (2013.01); *F02B 23/0663* (2013.01);
(Continued)

(58) Field of Classification Search
CPC ....... F02F 1/242; F02B 23/06; F02B 23/0633; F02B 23/0657; F02B 23/104;
(Continued)

(56) References Cited

U.S. PATENT DOCUMENTS 1,550,570 A * 8/1925 Romeiser .................. F02B 9/00
123/275
2,795,220 A * 6/1957 Atwood .................. F02B 75/34
123/145 R
(Continued)

FOREIGN PATENT DOCUMENTS

DE    102004039818 A1 *  3/2006  .......... F02B 19/1014
EP        1614874 A1 *  1/2006  .......... F02B 23/0672

*Primary Examiner* — Mahmoud Gimie
(74) *Attorney, Agent, or Firm* — Von Rohrscheidt Patents

(57) ABSTRACT

An ignition chamber of a combustion engine, the ignition chamber comprising: a piston having a piston bottom surface and a cylinder head having a cylinder head surface, the ignition chamber having an ignition chamber axis wherein one of said piston bottom surface and said cylinder head surface includes at least one depression and an ignition device is disposed in said ignition chamber and extends along said ignition chamber axis, said ignition device is configured to cause a cylindrical ignition impulse along said ignition chamber axis so as to create radial impulse components that are redirected by said depression so as to move in a direction longitudinal to said combustion chamber axis.

10 Claims, 3 Drawing Sheets

(51) Int. Cl.
*F02P 13/00* (2006.01)
*F02B 43/10* (2006.01)
*F02P 19/02* (2006.01)

(52) U.S. Cl.
CPC .......... *F02B 23/0693* (2013.01); *F02B 43/10* (2013.01); *F02F 1/24* (2013.01); *F02P 13/00* (2013.01); *F02P 19/02* (2013.01); *Y02T 10/125* (2013.01); *Y02T 10/32* (2013.01)

(58) Field of Classification Search
CPC ...... F02B 19/1095; F02B 19/12; F02B 19/16; F02B 19/04; F02M 27/04; F02P 19/026
USPC ..... 123/406.11, 179.6, 143 A, 143 B, 193.5, 123/256, 279, 193.6, 291
See application file for complete search history.

(56) References Cited

U.S. PATENT DOCUMENTS

| | | | | |
|---|---|---|---|---|
| 2,933,072 A | * | 4/1960 | Nallinger | F02B 19/14 123/288 |
| 3,703,886 A | * | 11/1972 | Witzky | F02B 17/005 123/256 |
| 7,431,003 B2 | * | 10/2008 | Ludwig | G01L 23/10 123/145 A |
| 8,434,442 B2 | * | 5/2013 | Mizunuma | F02B 23/0657 123/142.5 E |
| 2014/0230773 A1 | * | 8/2014 | Borissovskiy | F02F 1/242 123/193.5 |

* cited by examiner

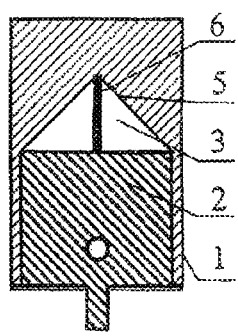
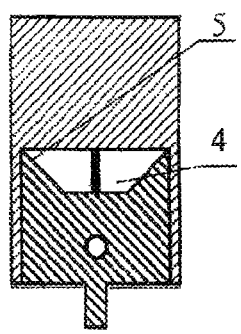
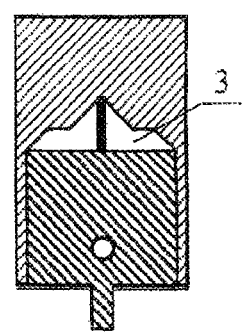
Fig.1     Fig.2     Fig.3
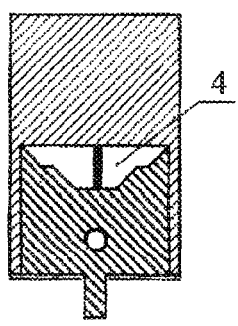
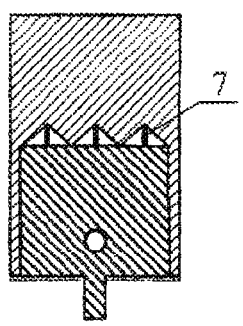
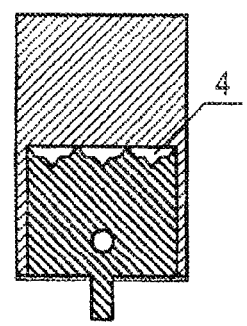
Fig.4     Fig.5     Fig.6
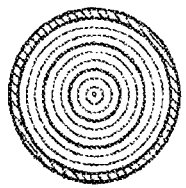
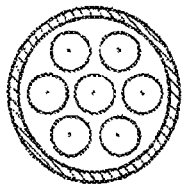
Fig.7     Fig.8

COMBUSTION CHAMBER, METHOD FOR IGNITING A FUEL-AIR MIXTURE IN A COMBUSTION CHAMBER OF AN INTERNAL COMBUSTION ENGINE AND INTERNAL COMBUSTION ENGINE

FIELD OF THE INVENTION

The present invention relates to a combustion chamber of a diesel engine, a method for igniting a fuel-air mixture in a combustion chamber of a diesel engine, and a diesel engine.

The invention relates to the fields of Machine Construction and Engine Construction and can find application in different types of diesel engines; its realization is achieved by the configuration of a special type of combustion chamber as well as by concomitant use of an ignition trigger with a defined orientation for the fuel-air mixture.

The invention guarantees a more effective transformation of the kinetic energy of the fuel molecule into useful work, i.e. an increase of the performance and of the degree of effectiveness of the diesel engine.

BACKGROUND OF THE INVENTION

Known is the combustion chamber of a diesel engine, configured by depressions in the piston bottom and in the cylinder head and having a cylindrical form (Intellectual Property Certificate of the USSR no. 337547. Cl. F 02 B 23/08, 1972.

The piston engine equipped with a cylindrical combustion chamber, but not with the necessary ignition variants for the fuel-air mixture has low performance and a low degree of effectiveness because of the inefficient transformation of the kinetic fuel molecules into useful work.

Known is the combustion chamber of a diesel engine, configured as a depression in the cylinder head and in the piston bottom and equipped with a valve with elevation (Patent DE 3145073, Class F02 B 45/10, 1983).

Such a configuration of the combustion chamber and the absence of the required variants for the ignition of the fuel-air mixture do not permit the effective transformation of the kinetic energy of the fuel molecule into useful work and an increase of the performance and of the degree of effectiveness of the combustion engine.

Known are variants of combustion chambers of piston engines, whose configuration consists in a plane piston bottom surface and at least one depression in the cylinder head, or in a plane cylinder head surface and at least one depression in the plane piston bottom surface, or at least two depressions, of which one in the cylinder head and one in the piston bottom surface, or with one depression in the piston bottom surface and at least one depression in the cylinder head surface. The depressions have the form of a pyramid, of a truncated pyramid, of a cone or of a truncated cone, of a hemisphere, of a hemisphere segment, of a paraboloid or of a step in the longitudinal section of the combustion chamber or the faun of a spiral or circular groove in the transversal section of the combustion chamber (Patent of the Russian Federation no. 2249718, Class F 02 F1/21, F02 F3/28, F02 B23/00. 2005).

The plurality of the application variants in the diesel engine cannot guarantee effective transformation of the kinetic energy of the fuel molecule into useful work. The disadvantage of the best of these combustion chamber variants consists in the absence of the necessary ignition variants for the fuel-air mixture, for which reason no maximum effective transformation of the kinetic energy of the fuel molecule into useful work, and no increase of the performance and of the degree of effectiveness of the engine are possible.

If, in a recipient, N molecules are present, it is well known that, at any time, N/3 molecules shall move lengthwise in any direction, whereby a half of them (i.e. N/6 molecules) shall move lengthwise in one direction in relation with the present direction of movement and the other half in the other direction (Saweljew I. W., General Physics Course in 4 volumes, Vol. 1, p. 363. Moskau, "Knorus" 2009.

This also applies to the gases formed in the combustion chamber formed as a result of combustion of the fuel-air mixture in the combustion chamber of the diesel engine.

When using traditional combustion chambers formed by cylinder walls as well as by the surface of the piston bottom and piston head, the greatest part of the energy of the expanding gasses is not used efficiently, as the useful work is carried out only by those molecules of the fuel (of the combustion products) that act on the piston bottom surface. The maximum useful work is carried out only by those molecules that act vertically on the piston bottom surface.

The molecules acting vertically on the cylinder walls have no part whatsoever in the movement of the piston in the direction of the bottom dead center.

As a considerable part of the gas molecules exercises its action on the cylinder walls, the kinetic energy of these molecules is not used effectively, and the useful work performed by these molecules is very insignificant and, as a result, it has an insignificant degree of effectiveness as well as insufficient performance of the combustion engine.

BRIEF SUMMARY OF THE INVENTION

The task of the invention consists in providing a combustion chamber for a diesel engine by which more efficient combustion is made possible. In particular, a number of variants of a specially designed combustion chamber of a diesel engine shall be presented, whose use leads to the required redistribution between the degrees of freedom of the fuel molecules. Furthermore, a procedure for the ignition of a fuel-air mixture in a combustion chamber of a diesel engine shall be indicated.

This task shall be solved with the help of the combustion chamber of a diesel engine in accordance with Claim 1, a procedure for the ignition of a fuel-air mixture in a combustion chamber of a diesel engine in accordance with Claim 14 and a diesel engine in accordance with Claim 15. Further descriptions are provided in the subordinate claims.

The invention makes possible a substantial improvement of the useful work performed by the fuel molecules as well as an increase of the degree of effectiveness of the engine.

The technical effect achieved by use of the recommended invention by provision of the depression and of the special ignition installation consists in a redistribution of the energy between the degrees of freedom of the fuel molecule in which the maximum energy for the degree of freedom associated with the forward movement of the molecule in a longitudinal direction to the movement axis of the piston is omitted (or, in other words, an equivalent decrease of the number of degrees of freedom of the fuel molecule takes place) and, consequently, no chaotic movement, but rather a targeted movement of the fuel molecule in the direction of the piston takes place, by which the conditions for the creation, maintenance and multiple reflection of a shock wave within a cycle, whose movement is done in the work chamber alongside the movement axis of the piston, are ensured. This leads to a more effective transformation of the kinetic energy of the fuel molecule into useful work, i.e. to an increase of the degree of effectiveness of the diesel engine.

An essential aspect of the present invention is that the ignition trigger is disposed longitudinally in relation to the axis of the combustion chamber and is adapted for the creation of linear self-ignition in relation to the axis of the combustion chamber. The disposition alongside the axis of the combustion chamber includes lying on the axis of the combustion chamber, but also dispositions parallel to the axis of the combustion chamber.

Such a redistribution of energy between the degrees of freedom of the fuel molecules is ensured by the fact that the useful work performed by the fuel molecules and consequently the degree of effectiveness of the engine can be substantially increased. More precisely, a combinatory effect is created by the special geometry of the combustion chamber with the depression, in combination with the special ignition trigger. This leads to a redistribution of energy between the degrees of freedom of the diesel fuel molecules, causing the omission of the maximum energy for the degree of freedom associated with the forward movement of the molecule in a longitudinal direction to the movement axis of the piston. Thus, no chaotic movement, but rather a targeted movement of the fuel molecule in the direction of the piston takes place, by which the conditions for the creation, maintenance and multiple reflection of a shock wave within a cycle, whose motion is in the work cylinder alongside the movement axis of the piston are guaranteed.

More precisely, the geometry of the combustion chamber permits a forward and back oscillation of the shock wave alongside the longitudinal axis of the combustion chamber, whereby the special geometry of the depression causes the redirecting of the ignition impulse from a radial direction into a longitudinal direction of the axis of the combustion chamber. Such combustion chamber geometries have been known from WO 2004/059144 A1, but not in combination with the special ignition trigger.

Although various ignition trigger have been known to date, they always caused punctual ignition, so that a spherical ignition impulse was formed. From this spherical ignition impulse, only isolated solid angle segments are redirected through the depression in the direction of the longitudinal axis of the combustion chamber, while large angle segment areas do not contribute any impulse in the longitudinal direction.

This situation is improved by the present invention by the fact that here an ignition trigger is adapted to create linear ignition alongside the axis of the combustion chamber. Instead of a punctiform or chaotic self-ignition, no spherical ignition emanating from the center takes place here, but rather a cylindrical ignition impulse, in which only radial impulse components in relation to the longitudinal axis of the combustion chamber are present. These radial impulse components can now be adjusted in their entirety only by means of the depression in longitudinal direction to the axis of the combustion chamber.

Thus, whereas in the case of punctual or chaotic self-ignition, only isolated solid angle areas of the ignition impulse can be adjusted by the depression in longitudinal direction in relation to the movement axis, in the case of the linear ignition used in the invention this refers, essentially, to the entire ignition impulse, as the latter consists, essentially, of impulses with radial effect and (if the coverage surface of the cylinder impulse is considered) of impulses with effect in the longitudinal direction of the movement axis.

By the use of linear ignition in longitudinal relation to the combustion chamber axis, as specified in the invention in combination with the depression, the degree of effectiveness of the diesel engine is considerably increased.

As known, the diesel fuel self-ignites at a certain temperature, this necessary temperature being provided by the adiabatic compression of the supplied air prior to the injection of the diesel fuel. An ignition auxiliary, e.g. in the form of a glow plug, is necessary for the start procedure only. For the implementation of the teaching of the invention, the specialist shall choose appropriate self-ignition triggers, which practically act as a germ cell for the self-ignition process and induce the diesel fuel to self-ignition on the combustion chamber axis.

As ignition triggers that cause self-ignition on a longitudinal route of the combustion chamber axis, the glow plugs themselves in an especially long configuration can be used, as well as rods made of metal (e.g. stainless steel), ceramic or suchlike materials that are not sensitive to combustion temperatures, arranged on the combustion chamber axis. If such rods are foreseen, the ignition auxiliaries need not be necessarily arranged on the combustion chamber axis too. Preferably, ignition auxiliaries and rods are combined so that, essentially, the entire combustion chamber axis is covered Especially convenient is the of the ignition trigger, which should essentially effect self-ignition over the entire axis of the combustion chamber. By "entire axis of the combustion chamber" is understood the clear height between the piston surface and the cylinder head surface at the time of ignition, whereby the depression extends in particular over this clear height, i.e. the clear height in its entirety is essentially within the depression.

Alternatively, a vertical extension of the ignition trigger in relation to the combustion chamber also provides significant advantages of a ≥10%, convenient ≥20%, more convenient ≥30%, even more convenient ≥40%, highly convenient ≥50%, more highly convenient a ≥60%, especially convenient ≥70%, extremely convenient ≥80% and particularly convenient ≥90%.

In a particularly convenient evolution, at least one means of injection, in particular an injection nozzle it is foreseen for the injection of diesel fuel and/or air, whereby at least one of these means of injection is disposed so that the direction of the injection is not identical with the axis of the combustion chamber. Accordingly, the injection device is disposed in an angle of 30° to 150°, preferably in an angle between 60° and 120° and in particular 90° to the axis of the combustion chamber. In such a case, during injection already, the diesel fuel-air mixture is given a radial direction of movement, which has a positive effect on combustion.

In this context, it is convenient for the air injection means and the diesel fuel injection means to be arranged symmetrically in relation to the axis of the combustion chamber, and particularly convenient is the case in which the injection directions of both injection means are situated on one axis.

The said technical effect becomes particularly effective in each of the variants of the invention listed hereunder, by use of a specially designed combustion chamber with concomitant use of different ignition procedures for the fuel-air mixture, as the depression is configured so as to render redirection especially effective.

In the combustion chamber of a diesel engine formed by a plane surface of the piston bottom and by a depression in the cylinder head, the depression of the invention has the form of a cone whose tip is not directed to the surface of the piston bottom, the angle between the plane surface of the piston bottom and the generatrix of the cone is of 40-50°, the radius of the cone basis surface can be smaller than or equal to the cylinder radius, whereby the extended glow plug on the combustion chamber axis serves as an ignition trigger, or else the ignition trigger can be a combination between a glow plug and a steel rod or a rod made of another materials with high thermal capacity, situated in the axis of the depression.

In the second variant of the combustion chamber of the diesel engine, the cylinder head depression has the form of a truncated cone, whose upper surface is not disposed in the direction of the plane piston bottom surface, the angle between the plane surface of the piston bottom and the generatrix of the cone is of 40-50°, the radius of the cone basis surface can be smaller than or equal to the cylinder radius, whereby the extended glow plug on the combustion chamber axis serves as an ignition trigger, or else the ignition trigger can be a combination between a glow plug and a steel rod or a rod made of another materials with high thermal capacity, situated in the axis of the depression.

In the third variant of the combustion chamber of a diesel engine, the cylinder head depression has a stepped configuration formed by the combination of a cone and at least one truncated cone or by the combination of at least two truncated cones, the angle between the plane surface of the piston bottom and the generatrix of the cone is of 40-50°, the radius of the cone basis surface can be smaller than or equal to the cylinder radius, whereby the extended glow plug on the combustion chamber axis serves as an ignition trigger, or else the ignition trigger can be a combination between a glow plug and a steel rod or a rod made of another materials with high thermal capacity, situated in the axis of the depression.

In the fourth variant the combustion chamber of the diesel engine is foamed by the plane piston bottom surface and at least one depression in the cylinder head; this depression, in accordance with the invention, is configured as a circular groove or as a combination between a central depression and at least one circular groove; the depressions in the central longitudinal section have a triangular, trapezoidal, or stepped form, and the angle between the plane surface of the piston bottom and the generatrix of the circular groove is of 40-50°, the radius of the cone basis surface can be smaller than or equal to the cylinder radius, whereby the ignition device for the fuel-air mixture (e.g. spark plug, glow plug or laser spark plug) is disposed in the cone tip or in the center of the upper surface of the cylinder head alongside to its axis.

In the fifth variant, the combustion chamber of the diesel engine is formed by the plane cylinder head surface and at least one depression in the piston bottom; this depression, in accordance with the invention, is configured as a cone whose tip is not oriented towards the cylinder head surface: the angle between the plane surface of the cylinder head and the generatrix of the cone is of 40-50°, the radius of the cone basis surface can be smaller than or equal to the cylinder radius, whereby the extended glow plug on the combustion chamber axis serves as an ignition trigger, or else the ignition trigger can be a combination between a glow plug and a steel rod or a rod made of another materials with high thermal capacity, situated in the axis of the depression.

In the sixth variant of the combustion chamber of a diesel engine, the depression in the piston bottom surface has the configuration of a truncated cone whose upper surface is not directed towards the cylinder head surface, the angle between the plane surface of the piston bottom and the generatrix of the cone is of 40-50°, the radius of the cone basis surface can be smaller than or equal to the cylinder radius, whereby the extended glow plug on the combustion chamber axis serves as an ignition trigger, or else the ignition trigger can be a combination between a glow plug and a steel rod or a rod made of another materials with high thermal capacity, situated in the axis of the depression.

In the seventh variant of the combustion chamber of a diesel engine, the depression in the piston bottom surface has a stepped configuration formed by the combination of a cone and at least one truncated cone or by the combination of at least two truncated cones, the angle between the plane surface of the piston bottom and the generatrix of the cone is of 40-50°, the radius of the truncated cone basis surface can be smaller than or equal to the cylinder radius, whereby the extended glow plug on the combustion chamber axis serves as an ignition trigger, or else the ignition trigger can be a combination between a glow plug and a steel rod or a rod made of another materials with high thermal capacity, situated in the axis of the depression.

In the eighths variant, the combustion chamber of the diesel engine formed by the plane surface of the cylinder head and at least one depression in the piston bottom surface: this depression, in accordance with the invention, is configured as a circular groove or as a combination between a central depression and at least one circular groove; the depressions in the central longitudinal section have a triangular, trapezoidal, or stepped form, and the angle between the plane surface of the cylinder head and the generatrix of the circular groove is of 40-50°, whereby the extended glow plug on the combustion chamber axis serves as an ignition trigger, or else the ignition trigger can be a combination between a glow plug and a steel rod or a rod made of another materials with high thermal capacity, situated in the axis of the depression, and in the circular groove there can be a cylindrical element made of the same material, element which can also serve as an ignition trigger for the fuel-air mixture.

In all the listed variants, the more accurate the processing quality of the smooth walls of the combustion chamber, the higher the useful work of the invention.

The aforementioned depression forms by which the combustion chamber of a diesel engine is configured cause, in combination with the ignition triggers for the fuel-air mixture (rod and cylindrical metal element with high thermal capacity), the preferred formation of a targeted movement of the fuel molecules, by which a maximum number of fuel molecules can be transformed into useful work. The absence of the cylindrical walls in the recommended engine chamber variants when positioning the piston in the upper dead center determines a decrease of the ineffective use of energy in the fuel molecules (e.g. when using a spark plug or a short glow plug).

The use of the recommended combustion chamber variants in combination with the ignition device of the invention for the fuel-air mixture (rod and cylindrical metal element with high thermal capacity) leads to an improved effectiveness of the transformation of the kinetic energy of fuel molecules into useful work, as well as to the increase of the performance and of the degree of effectiveness of the diesel engine.

The maximum smoothness of the walls in each combustion chamber variant aimed at the suppression of the wave effect, the heating of the combustion chamber is diminished, as the shock waves, as well as the electromagnetic, optical, infrared and ultraviolet waves are reflected by the combustion chamber walls. The heat losses in the combustion chamber wall and those caused by the heat discharge to the cooling means can thus be diminished. Moreover, the destruction of the combustion chamber by excessively high temperatures can be prevented.

The acoustic waves and shock waves created in the combustion chamber cause additional useful work by their reflection by the combustion chamber wall. This leads to an improved effectiveness of the transformation of the kinetic energy of fuel molecules into useful work, as well as to the increase of the performance and of the degree of effectiveness of the combustion engine.

Independent protection is required for the ignition procedure and the combustion engine as described in the invention. The diesel engine as described in the invention is built in the modality known to the specialist and contains the combustion chamber as described in the invention.

Various characteristics of the present invention can be combined with one another, unless otherwise specified.

BRIEF DESCRIPTION OF THE DRAWINGS

The characteristics of the present invention and other advantages shall be clarified hereunder by description of preferred execution examples. The explanation of the invention is done by means of the following purely schematic figures:

FIG. 1 Shows the longitudinal section through the combustion chamber formed by the plane piston bottom surface and by the depression in the cylinder head; the depression has the form of a cone, and the ignition trigger is on the cone axis;

FIG. 2 Shows a combustion chamber consisting in the upper cylinder head surface and in the depression in the form of a truncated cone in the piston bottom surface FIG. 3 Shows a combustion chamber formed by the plane piston bottom surface and by the stepped depression in the cylinder head, as well as the longitudinal section of the combustion chamber;

FIG. 4 Shows a combustion chamber formed by the plane cylinder head surface and by the stepped depression in the piston bottom surface, as well as the longitudinal section of the combustion chamber;

FIG. 5 Shows a combustion chamber formed by the plane piston bottom surface as well as from a combination between the central depression and the circular groove in the cylinder head; the depressions in longitudinal section have a triangular form, the FIG. 6 represents the circular-cylindrical element in the groove (this figure also shows the longitudinal section of the combustion chamber, formed by seven conic depressions in the piston bottom or in the cylinder head).

FIG. 6 Shows a combustion chamber consisting of the plane cylinder head surface as well as from a combination between the central depression and the circular groove in the piston bottom; in longitudinal section the depressions have a stepped form (this figure also shows the longitudinal section of the combustion chamber, formed by seven conic depressions in the piston bottom or in the cylinder head).

FIG. 7 Shows the longitudinal section of the combustion chamber presented in FIG. 6 (the combination between the central depression and the circular groove).

FIG. 8 Shows a combustion chamber consisting of the plane piston bottom surface and the cylinder head with seven conic depressions, as well as the longitudinal section of the combustion chamber (the central longitudinal section of this combustion chamber is represented in FIG. 5).

DETAILED DESCRIPTION OF THE INVENTION

Figure 9:
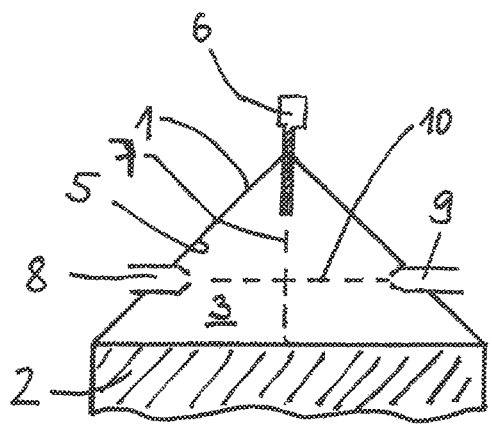
FIGS. 9 to 11 Show various configurations with regard to the injection collocation.

It can be clearly seen that the combustion chamber of the combustion engine as described in the invention shows a cylinder 1 and a piston 2. The combustion chamber is formed by the plane surface of the piston bottom 2 and the depression 3 in the cylinder head (see, for instance, FIG. 1). The combustion chamber can also be formed by the plane surface of the cylinder head 1 and the depression 4 in the piston bottom (see, for instance, FIG. 2). Alternatively (not shown), depressions in the piston 2 and in the cylinder head 1 can be combined.

Each of the depressions 3 and 4 has the form of a cone, of a truncated cone or of a step. The depressions 3 and 4 can also be configured as a spiral or circular groove, which has, in longitudinal section of the combustion chamber, a triangular, trapezoidal or stepped form or which is limited by a semicircle or by an arch.

The surfaces of combustion chamber walls 5 are manufactured with maximum smoothness, for the reflection of the shock effect. Also foreseen are ignition triggers 6, 6a, 6b and the combustion chamber has a combustion chamber axis 7. In FIGS. 1 to 4 it can be noted that the ignition trigger 6 for the fuel-air mixture is positioned on the depression axis.

The optimal angle to be installed between the piston head or the cylinder head and the generatrix of the cone or of the truncated cone is of 40°-50°. If the angle is decreased below 40° or increased in excess of 50°, the effectiveness of the transformation of the kinetic energy of the fuel molecule into useful work.

The invention functions as follows. Let us consider the following variant: the conic depression determines, at an angle of 45° between the plane surface and the generatrix of the cone, the concomitant ignition of the fuel-air mixture by use of an extended glow plug or with the ignition trigger (metal rod with high thermal capacity.

The ignition of the fuel-air mixture with the glow plug alone or with the combined ignition trigger 6a, 6b alongside the combustion chamber axis 7 when using a laser beam or a glow plug lends to the fuel molecules (the molecules of the combustion products) a radial movement direction in relation to the ignition line. After reflection on the depression wall 5 under an angle of 45°, the molecules continue their motion alongside the direction of the piston movement on parallel, non-intersecting movement tracks, are then reflected by the plane surface and resume their movement in the direction of the conic depression: this happens several times in the course of a cycle. No contact takes place between the fuel molecules and the surface of the cylinder wall, i.e. all the molecules do useful work. As the distances covered by the molecules in the course of a time unit are equal, the molecules move in a narrow front parallel to the plane surface of the piston bottom or cylinder head, which prevents their possible collisions and the chaotization of the system within a long period of time that exceeds significantly the cycle time of the engine. The resulting electromagnetic and shock waves as well as the high-energy gas particles are reflected by the smooth surface 5 of the combustion chamber, whereby its heating decreases and an effective transformation of the kinetic energy both of the gas and of the waves into useful work is guaranteed. In this manner, the pressure on the piston is significantly increased and the heating of the cylinder block of the combustion engine is significantly decreased, which results in the extension of its lifecycle.

In FIG. 9, the collocation of the ignition device 6 in the cylinder head 1, configured as a long glow plug, of an injection nozzle 8 for air and of an injection nozzle 9 for the diesel fuel, is presented. It can be seen that the injection nozzles 8, 9 are disposed symmetrically, with the injection directions on a line 10. This line 10 is disposed perpendicularly to the combustion chamber axis 7. In this manner, the maximum effect is achieved, as the created fuel-air mixture already shows radial impulse parts in relation to the combustion chamber axis 7 and, apart from this, the mixture picture is configured very symmetrically and the mixture parts are very finely pulverized by the collision between air and fuel, which also leads to better combustion.

Figure 10:
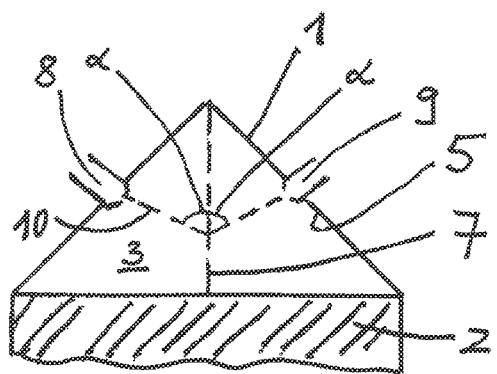

In FIG. 10, the two injection nozzles 8, 9 are not disposed perpendicularly, but rather under an acute angle a in relation to the combustion chamber axis 7. Here too, a positive effect is created, because the fuel-air mixture shows radial impulse parts.

Figure 11:
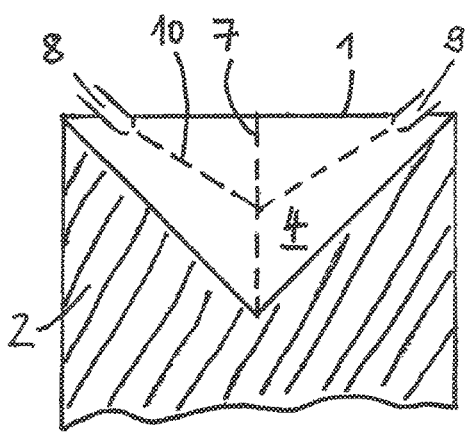

While FIGS. 9 and 10 show a combustion chamber geometry with a depression 3 in the cylinder head 1, FIG. 11 shows a combustion chamber geometry with a depression 4 in the piston 2, whereby the injection nozzles 8, 9 are again not disposed perpendicularly, but rather under an acute angle a in relation to the combustion chamber axis 7.

Figure 12:
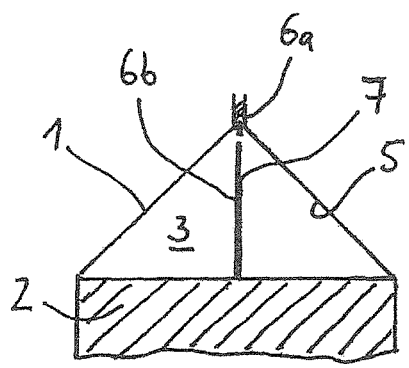
FIGS. 12 to 15 Show various configurations with regard to the ignition trigger
Figure 13:
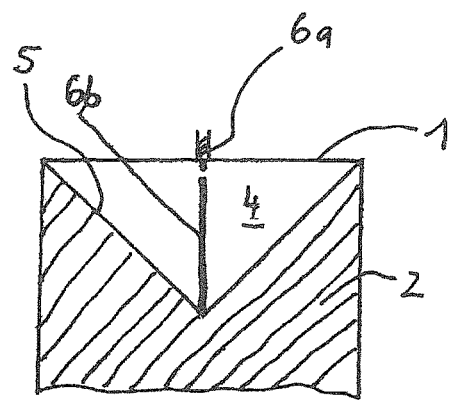
Figure 14:
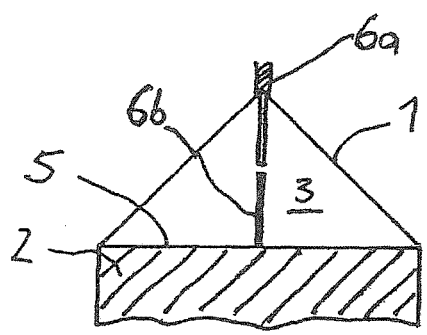
Figure 15:
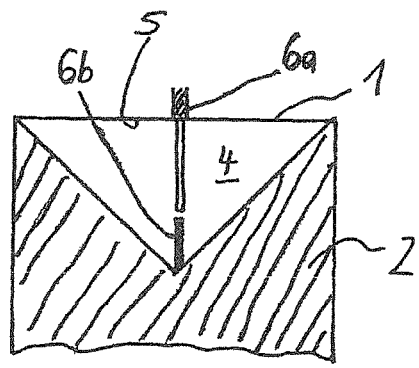

In FIGS. 12 to 15, various ignition trigger variants are shown in further detail in relation with different combustion chamber geometries, whereby in FIGS. 12 and 14 depression 3 is positioned in the cylinder head 1 and in FIGS. 13 and 15 depression 4 is positioned in the piston bottom 2. In FIGS. 12 and 13, the ignition trigger 6 is configured as a short glow plug with a long rod 6b, whereas in FIGS. 14 and 15 the ignition trigger is configured as a long glow plug with a short rod 6b.

When starting the diesel engine, the glow plug 6a serves as an ignition auxiliary and, in operation, glow plug 6a and rod 6b act together as ignition trigger 6 for inducing self-ignition on the combustion chamber axis. Together, glow plug 6a and rod 6b essentially cover the entire combustion chamber axis, so that a complete cylinder-shaped impulse distribution results. If rod 6b is omitted or shortened, this effect is diminished, while the invention foresees that self-ignition takes place linearly alongside of a part of the combustion chamber axis.

What is claimed is:

1. A combustion chamber of an internal combustion engine, the combustion chamber comprising:
   a piston including a piston top surface;
   a cylinder head including a cylinder head surface; and
   a combustion chamber axis,
   wherein the piston top surface or the cylinder head surface include at least one depression,
   wherein the at least one depression substantially forms the combustion chamber when the piston is at a top dead center,
   wherein the at least one depression is arranged in unobstructed facing relation to another of the piston top surface and the cylinder head surface,
   wherein the at least one depression has at least a partially conical shape,
   wherein an ignition device is arranged along the combustion chamber axis or parallel to the combustion chamber axis,
   wherein the ignition device is arranged in unobstructed facing relation to the at least one depression in a radial direction of the combustion chamber axis, and
   wherein the ignition device is configured to initiate a cylindrical ignition impulse in the at least one depression along the combustion chamber axis or parallel to the combustion chamber axis so that the cylindrical ignition impulse propagates essentially only with radial ignition impulse components from the ignition device to the piston top surface or the cylinder head surface.

2. The combustion chamber according to claim 1,
   wherein the at least one depression is configured in the cylinder head wherein the at least one depression is shaped as a cone whose tip is not oriented towards the piston top surface and the ignition device is positioned in the tip of the cone, or
   wherein the at least one depression is configured in the cylinder head wherein the at least one depression is shaped as a truncated cone whose upper surface is not oriented towards the piston top surface of piston and the ignition device is positioned in a center of an upper surface of the truncated cone, or
   wherein the at least one depression is configured in the cylinder head wherein the at least one depression includes a step generated by a combination between a cone and at least one truncated cone or by a combination of at least two truncated cones,
   wherein the ignition device is positioned at a tip of the cone or in a center of a upper surface of the truncated cone,
   wherein an angle between a piston top surface that is orthogonal to the combustion chamber axis and a generatrix of the cone and of the truncated cone is 40°-50° so that the radial ignition impulse components are reflected by the depression into a direction that is parallel to the combustion chamber axis.

3. The combustion chamber according to claim 1,
   wherein the at least one depression is configured in the piston top surface wherein the at least one depression is shaped as a cone whose tip is not oriented towards the cylinder head and the ignition device is positioned in a center of a flat surface of the cylinder head, or
   wherein the at least one depression is configured in the piston top surface, wherein the at least one depression is shaped as a truncated cone, whose upper surface is not oriented towards the cylinder head and the ignition device is positioned in a center of a flat surface of the cylinder head, or
   wherein the at least one depression is configured in the piston top surface wherein the at least one depression includes a step generated by a combination between a cone and at least one truncated cone or by a combination of at least two truncated cones wherein the ignition device is positioned at a tip of the cone or in a center of an upper surface of the truncated cone,
   wherein an angle between the cylinder head surface and a generatrix of the cone or the truncated cone is of 40°-50°, so that the radial ignition impulse components are reflected by the depression into a direction that is parallel to the combustion chamber axis.

4. The combustion chamber according to claim 1,
   wherein the ignition device is a spark plug, a glow plug or a laser spark plug.

5. The combustion chamber according to claim 1,
wherein the ignition device is configured initiate the cylindrical ignition impulse of a fuel-air mixture simultaneously along an entire axis of the at least one depression, or
wherein the ignition device is configured so that an extension of a linear ignition length along the combustion chamber axis is ≥90% of an axial combustion chamber height.

6. The combustion chamber according to claim 2, wherein a clear height of the combustion chamber axis is arranged within the at least one depression.

7. The combustion chamber according to claim 2, wherein a radius of a bottom surface of the cone is smaller than or equal to a cylinder radius.

8. The combustion chamber according to claim 2, wherein a radius of a bottom surface of the truncated cone is smaller than or equal to a cylinder radius.

9. The combustion chamber according to claim 1, wherein
at least one injection device is provided for an injection of air or fuel,
wherein at least one of the at least one injection device is oriented so that an injection direction does not coincide with the combustion chamber axis,
wherein an injection direction is oriented at an angle of 30° to 150° relative to the combustion chamber axis.

10. The combustion chamber according to claim 1,
wherein an injection device for air and an injection device for fuel are disposed symmetrically with respect to the combustion chamber axis, and
wherein an injection direction of the injection device for air and an injection direction of the injection device for fuel are arranged on one axis.

* * * * *